United States Patent
Kosaka et al.

(10) Patent No.: US 9,836,076 B2
(45) Date of Patent: Dec. 5, 2017

(54) BICYCLE OPERATING DEVICE

(71) Applicant: SHIMANO INC., Sakai-ku, Sakai, Osaka (JP)

(72) Inventors: Kentaro Kosaka, Sakai (JP); Yoshimitsu Miki, Sakai (JP)

(73) Assignee: SHIMANO INC., Sakai, Osaka (JP)

( * ) Notice: Subject to any disclaimer, the term of this patent is extended or adjusted under 35 U.S.C. 154(b) by 800 days.

(21) Appl. No.: 13/756,011

(22) Filed: Jan. 31, 2013

(65) Prior Publication Data

US 2014/0208889 A1   Jul. 31, 2014

(51) Int. Cl.
| | | |
|---|---|---|
| F16C 1/10 | (2006.01) |
| G05G 1/04 | (2006.01) |
| B62M 25/08 | (2006.01) |
| B62K 23/06 | (2006.01) |

(52) U.S. Cl.
CPC ............ *G05G 1/04* (2013.01); *B62K 23/06* (2013.01); *B62M 25/08* (2013.01); *Y10T 74/20612* (2015.01)

(58) Field of Classification Search
USPC ......................... 74/501.6, 502.2, 522, 551.9
See application file for complete search history.

(56) References Cited

U.S. PATENT DOCUMENTS

| | | | | |
|---|---|---|---|---|
| 5,921,138 A | * | 7/1999 | Kojima et al. | 74/473.13 |
| 6,015,036 A | * | 1/2000 | Fukuda | 192/217 |
| 6,095,010 A | * | 8/2000 | Arbeiter et al. | 74/473.14 |
| 7,024,959 B2 | * | 4/2006 | Tetsuka et al. | 74/502.2 |
| 7,854,180 B2 | | 12/2010 | Tetsuka | |
| 8,065,932 B2 | * | 11/2011 | Hara et al. | 74/502.2 |
| 8,584,550 B1 | * | 11/2013 | Calendrille, Jr. | 74/502.2 |
| 2005/0274562 A1 | | 12/2005 | Yagi | |
| 2007/0068315 A1 | * | 3/2007 | Oseto | 74/502.2 |
| 2007/0137385 A1 | * | 6/2007 | Cesur et al. | 74/501.6 |
| 2007/0193387 A1 | | 8/2007 | Nakano | |
| 2008/0098848 A1 | | 5/2008 | Dal Pra' et al. | |
| 2012/0255390 A1 | * | 10/2012 | Warren et al. | 74/522 |
| 2013/0008280 A1 | * | 1/2013 | Hsu | 74/522 |

FOREIGN PATENT DOCUMENTS

| | | |
|---|---|---|
| DE | 20 2012 104 005 U1 | 10/2012 |
| GB | 179459 | 5/1922 |

OTHER PUBLICATIONS

German Search Report dated Jan. 20, 2015.

* cited by examiner

*Primary Examiner* — Vicky A Johnson
(74) *Attorney, Agent, or Firm* — Jeffer Mangels; Butler & Mitchell LLP; Brennan C. Swain, Esq.

(57) ABSTRACT

A bicycle operating device for operating at least one bicycle component. The bicycle operating device includes a base member configured to be mounted on a bicycle handlebar that defines a handlebar axis and a first operating member rotatably supported on the base member about the bicycle handlebar when the base member is mounted on the bicycle handlebar. The first operating member is configured to be at least partially adjustably supported on the base member.

24 Claims, 5 Drawing Sheets

BICYCLE OPERATING DEVICE

FIELD OF THE INVENTION

The present invention relates to a bicycle operating device, and more specifically to a bicycle operating device that includes adjustable user interface portions.

BACKGROUND OF THE INVENTION

There are known bicycle operating devices for operating various aspects of the bicycle, such as shifting or braking. For example, many shifting devices are electric powered and configured such that they can be controlled electrically so as to change among a plurality of gear positions (e.g., U.S. Pat. No. 7,854,180 to Tetsuka, and U.S. Patent Publication No. 2007/0193387 to Nakano the entireties of which are incorporated herein by reference). These types of devices include electric switches and can be mounted to a handlebar. However, due to the differences in size of riders hands, it is desirable to provide adjustability of the positioning of the user interface portions.

In view of the above, there exists a need for an improved bicycle operating device. This invention addresses this need in the art as well as other needs, which will become apparent from this disclosure to those skilled in the art.

SUMMARY OF THE PREFERRED EMBODIMENTS

In accordance with a first aspect of the present invention there is provided a bicycle operating device for operating at least one bicycle component. The bicycle operating device includes a base member configured to be mounted on a bicycle handlebar that defines a handlebar axis and a first operating member rotatably supported on the base member about the bicycle handlebar when the base member is mounted on the bicycle handlebar. The first operating member is configured to be at least partially adjustably supported on the base ember. In a preferred embodiment, the first operating member includes a first mounting portion that is rotatably supported on the base member about the bicycle handlebar when the base member is mounted on the bicycle handlebar, and a first user interface portion adjustably connected to the first mounting portion. The first user interface portion is adjustable in a first direction, and, when the bicycle operating device is mounted on the bicycle handlebar the first direction is parallel to the handlebar axis. The first operating member rotates from a first rest position to a first operation position and is biased toward the first rest position to return it to the first rest position. In a preferred embodiment, the bicycle operating device includes a second operating member supported on the base member. The second operating member is configured to rotate about the bicycle handlebar when the base member is mounted on the bicycle handlebar, includes a second mounting portion rotatably supported on the base member about the bicycle handlebar when the base member is mounted on the bicycle handlebar, and a second user interface portion connected to the second mounting portion. Preferably, the second user interface portion is adjustably connected to the second mounting portion. In a preferred embodiment, the second user interface portion is adjustable in a second direction, and, when the bicycle operating device is mounted on the bicycle handlebar, the second direction is parallel to the handlebar axis.

In a preferred embodiment, the first operating member is rotatable from a first rest position to a first operation position and is biased toward the first rest position to return to the first rest position, and the second operating member is rotatable from a second rest position to a second operation position and is biased toward the second rest position to return to the second rest position. Preferably, when the bicycle operating device is mounted on the bicycle handlebar and the first operating member is rotated to the first operation position, the second operating member remains stationary, and the first operating member and the second opera ng member rotate together when the second operating member is rotated to the second operation position. The first mounting portion defines a first axis and the second mounting portion defines a second axis that are both coaxial with the bicycle handlebar axis when the bicycle operating device is mounted on the bicycle handlebar.

In accordance with another aspect of the present invention there is provided a bicycle operating device for electrically operating at least one bicycle component. The bicycle operating device includes a base member configured to be attached to a bicycle handlebar that has a handlebar axis, and a first operating member movably supported on the base member. The first operating member includes a first mounting portion movably attached to the base member and a first user interface portion adjustably connected to the first mounting portion. The first user interface portion is adjustable in a direction parallel to the handlebar axis when the base member is attached to the bicycle handlebar. In a preferred embodiment, the bicycle operating device includes a second operating member movably supported on the base member that includes a second mounting portion movably attached to the base member and a second user interface portion connected to the second mounting portion. Preferably, when the base member is attached to the bicycle handlebar, the first mounting portion rotates about the bicycle handlebar while the second mounting portion remains stationary when the first operating member is operated, and the first mounting portion and the second mounting portion rotate together about the bicycle handlebar when the second operating member is operated.

The invention, together with additional features and advantages thereof, may be best understood by reference to the following description.

BRIEF DESCRIPTION OF THE DRAWINGS

Like numerals refer to like parts throughout the several views of the drawings.

DETAILED DESCRIPTION OF THE PREFERRED EMBODIMENTS

Figure 1:
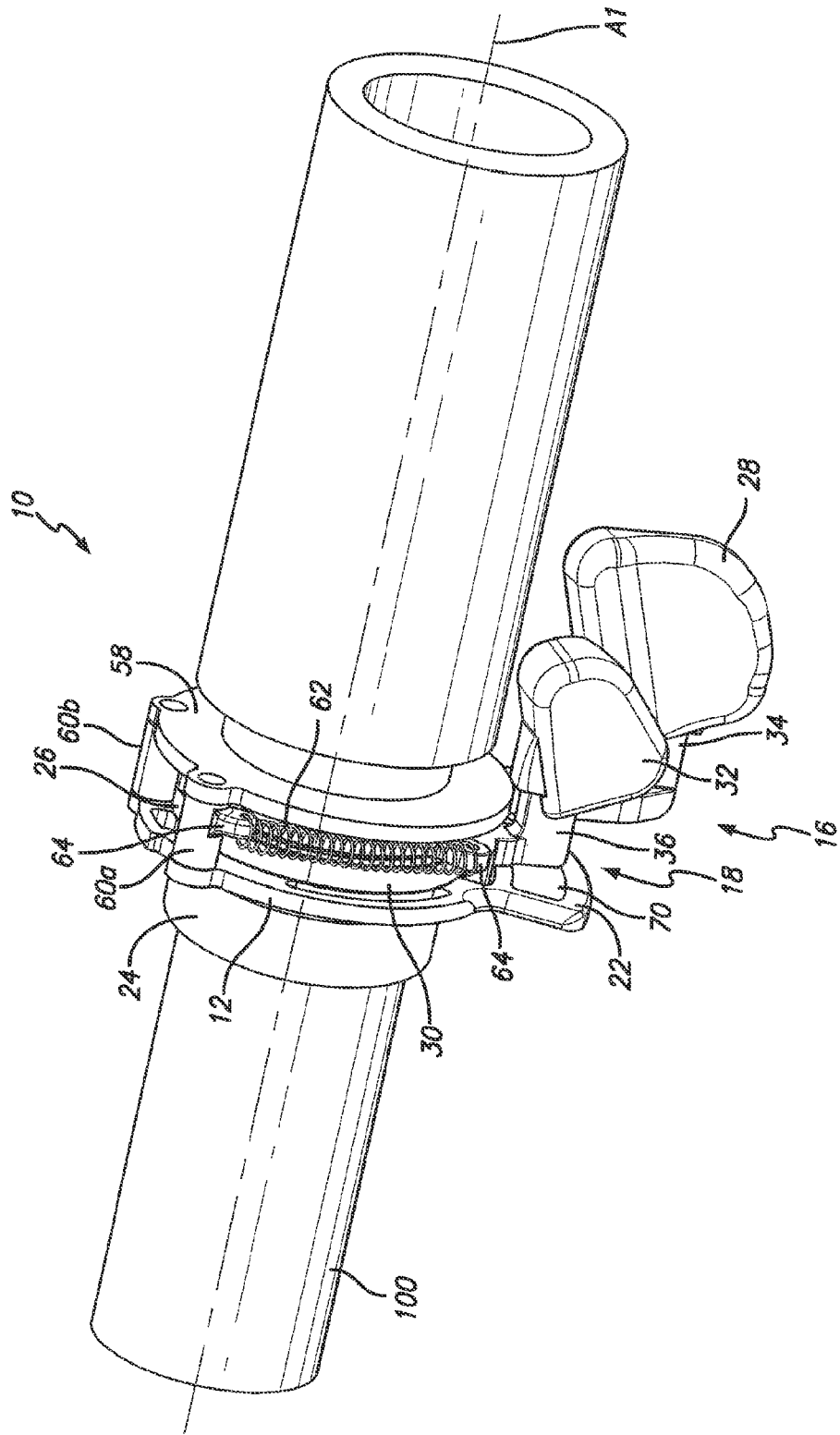
FIG. 1 is a perspective view of a bicycle operating device mounted on a handlebar in accordance with a preferred embodiment of the present invention.

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Referring to FIGS. 1-4C, a bicycle operating device 10 that is adapted to be mounted on or attached to a bicycle handlebar 100 of a bicycle (not shown) is illustrated in accordance with an embodiment of the present invention, in a preferred embodiment, the bicycle operating device 10 generally includes a base member 12, a rotation assembly 14, a first operating member 16 and a second operating member 18. In a preferred embodiment, base member 12 includes a seat portion 20 that is formed as a cylindrical member, a flange portion 22 that extends radially outwardly from the seat portion 20, and a clamp member 24 that is fixed to the flange portion 22 and is adapted to be attached to the bicycle handlebar 100 (e.g., by a threaded fastener 24a). In a preferred embodiment, the clamp member 24 is formed as a C-shape member and is fixed to the bicycle handlebar 100 by using a fastener member, e.g., a bolt 24a. Such clamp members are well known in the art and, therefore, other types of clamp members can be used. In another embodiment, the clamp member can be omitted.

As shown in FIGS. 1-4C, the first operating member 16 includes a first mounting portion 26 rotatably supported on the seat portion 20 of the base member 12 via the rotation assembly 14, and a first user interface portion 28 that is connected to the first mounting portion 26. The second operating member 18 includes a second mounting portion 30 rotatably supported on the seat portion 20 of the base member 12 via the rotation assembly 14, and a second user interface portion 32 that is connected to the second mounting portion 30.

In a preferred embodiment, the first user interface portion 28 is adjustably connected to the first mounting portion 26 and the second user interface portion 32 is adjustably connected to the second mounting portion 30. The first and second user interface portions 28 and 32 can be adjustable in a number of different directions with respect to an axis A1 defined by the bicycle handlebar 100. For example, as shown in FIGS. 3A-3B, in a preferred embodiment, the first and second user interface portions 28 and 32 are adjustable in a direction that is approximately parallel with the handlebar axis A1 (see arrows D1 and D2).

Figure 2:
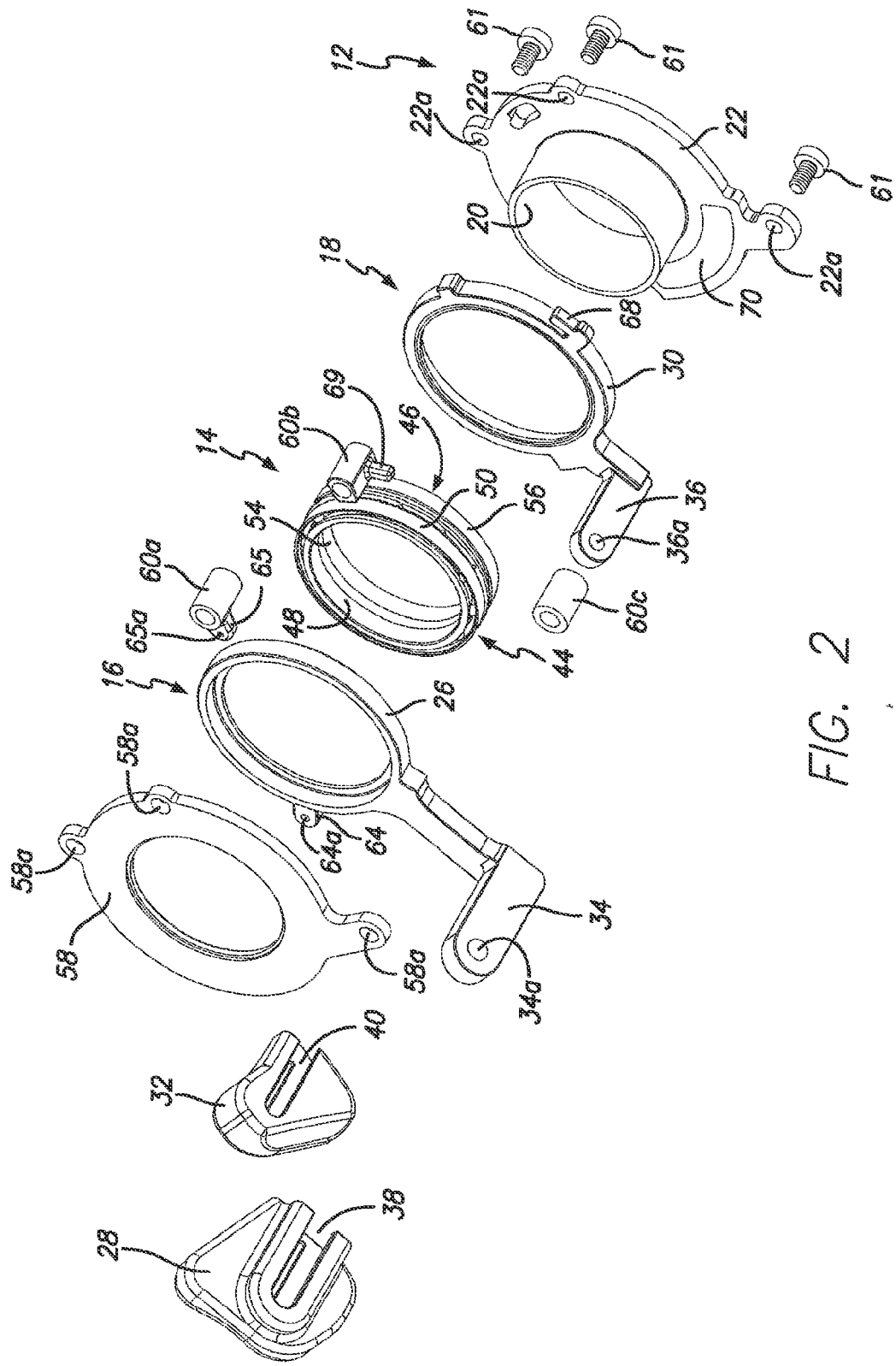
FIG. 2 is an exploded perspective view of the bicycle operating device of FIG. 1.
Figure 3A:
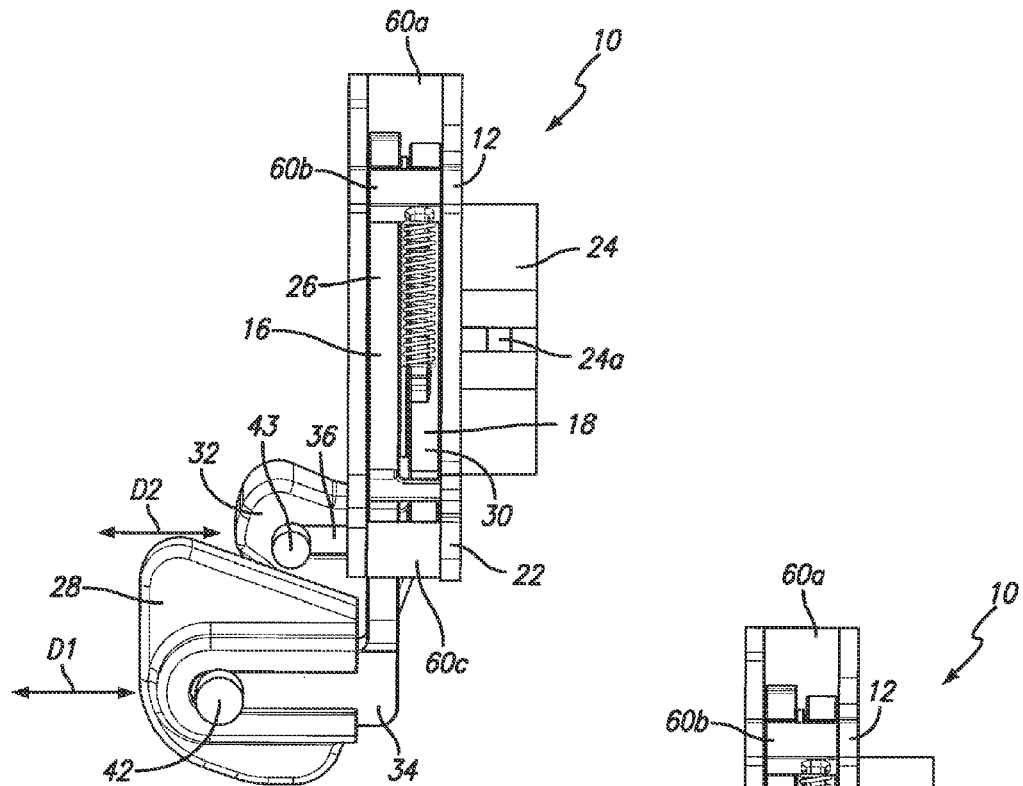
FIG. 3A is a front elevational view of the bicycle operating device of FIG. 1 with the first and second user interface portions in a first position.
Figure 3B:
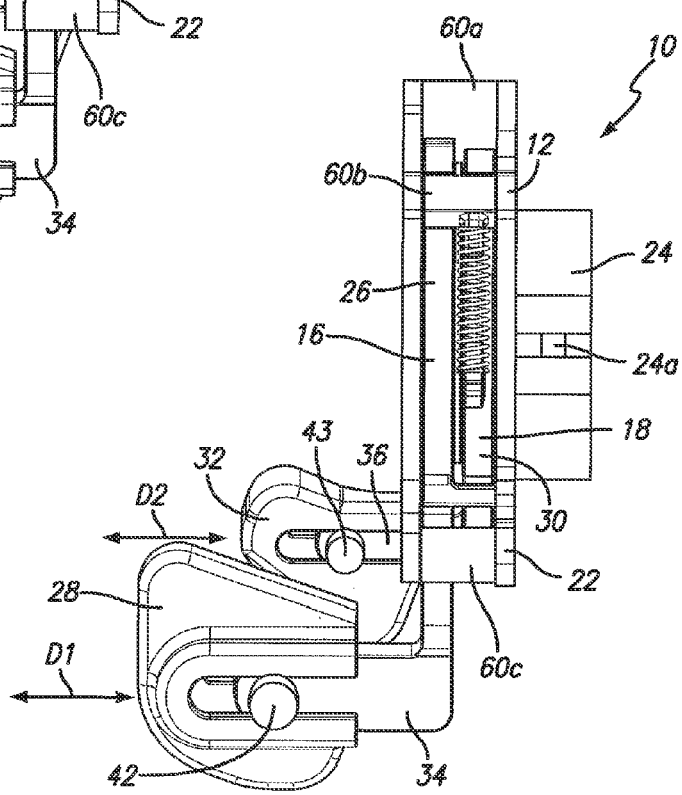
FIG. 3B is a front elevational view of the bicycle operating device of FIG. 1 with the first and second user interface portions in a second position.

In a preferred embodiment, as shown in FIGS. 2 and 3A-3B, the first mounting portion 26 includes a first arm 34 that receives the first user interface portion 28 and the second mounting portion 30 includes a second arm 36 that receives the second user interface portion 32. The first user interface portion 28 includes a first slot 38 defined therein and the second user interface portion 32 includes a second slot 40 defined therein. A threaded fastener 42 (FIGS. 3A-3B) extends through the first slot 38 and is received in an opening 34a in the first arm 34 to secure the first user interface portion 28 in place. To adjust the position of the first user interface portion 28, the threaded fastener 42 is loosened, the first user interface portion 28 is moved in direction D1 and the threaded fastener 42 is retightened. A threaded fastener 43 also extends through the second slot 40 and is received in an opening 36a in the second arm 36 to secure the second user interface portion 32 in place. To adjust the position of the second user interface portion 32, the threaded fastener 43 is loosened, the second user interface portion 32 is moved in direction D2 and the threaded fastener 43 is retightened. As shown in FIG. 1, in a preferred embodiment, the first mounting portion 26 and second mounting portion 30 are coaxial with the handlebar axis A1.

In another embodiment, the first and second user interface portions 28 and 32 are adjustable in a direction that is approximately perpendicular with the handlebar axis A1 or in a direction that is non-parallel or non-perpendicular with respect to the handlebar axis A1. In another embodiment, the first user interface portion 28 and the second user interface portion 32 are adjustable in a circumferential direction about the handlebar axis A1. In another embodiment, one of the first user interface portion 28 or the second user interface portion 32 is adjustable and the other is not.

Figure 4A:
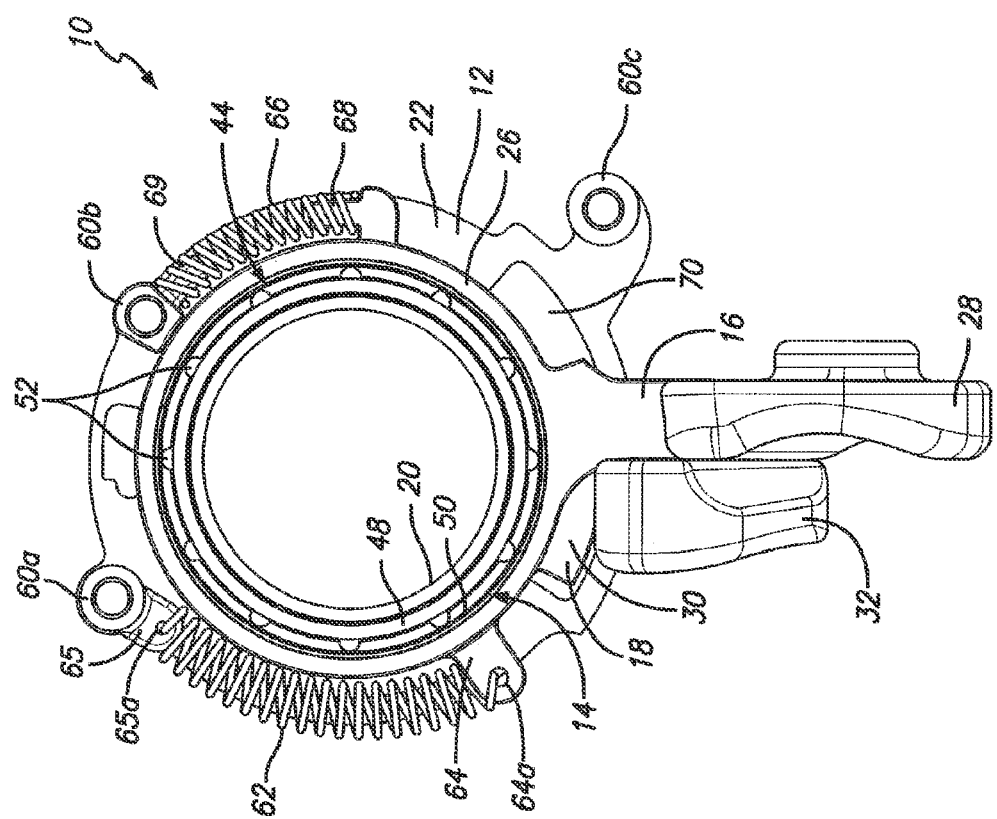
FIG. 4A is a front elevational view of the bicycle operating device of FIG. 1 with the ring cover removed and showing the first and second operating members in the rest position.
Figure 4B:
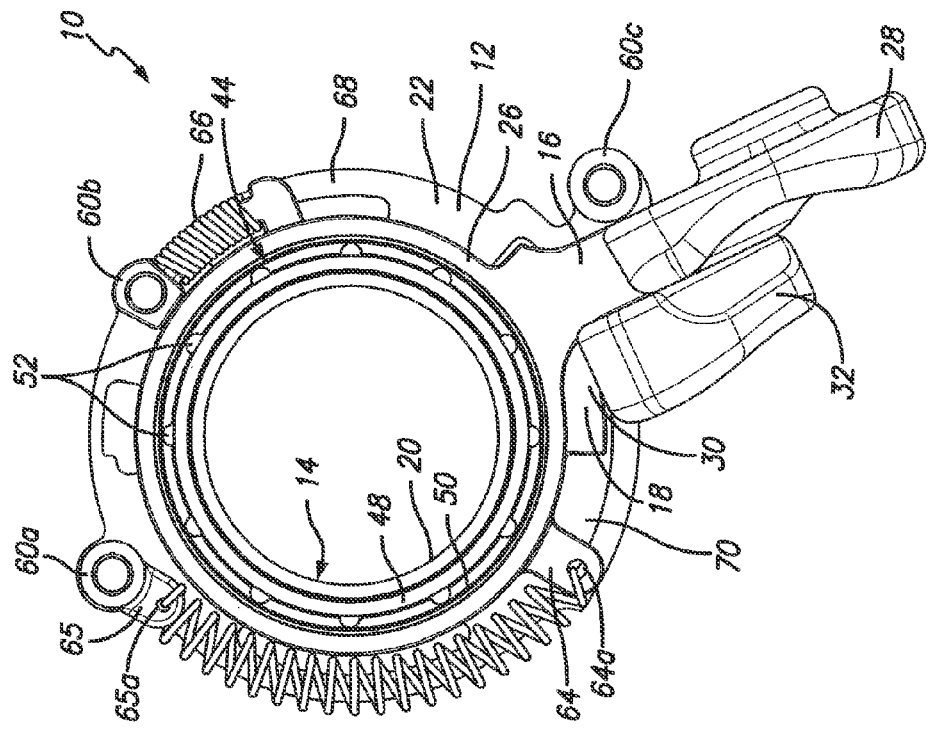
FIG. 4B is a side elevational view of the bicycle operating device of FIG. 1 with the ring cover removed and showing the second operating member in the rest position and the first operating member in the operation position.
Figure 4C:
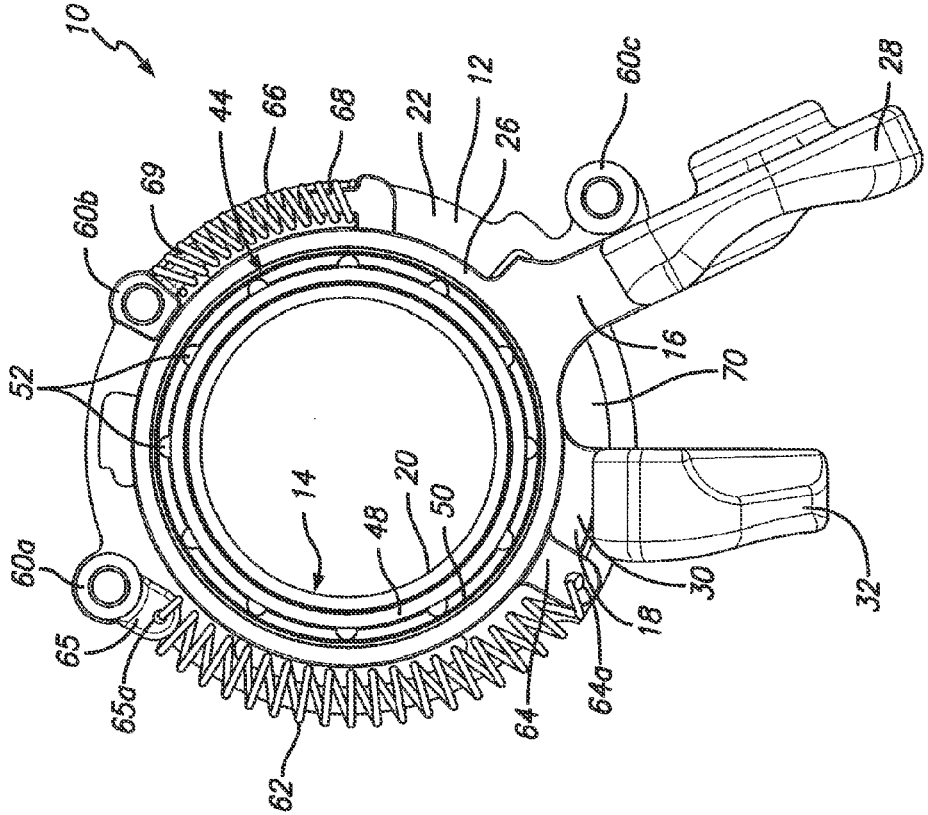
FIG. 4C is a side elevational view of the bicycle operating device of FIG. 1 with the ring cover removed and showing the first and second operating members in the operation position.

As shown in FIGS. 4A-4C, in a preferred embodiment, the rotation assembly 14 is seated on the seat portion 20. As shown in FIG. 2, the rotation assembly 14 includes a first bearing assembly 44 and a second bearing assembly 46. The first bearing assembly 44 includes a first inner race 48, which is adjacent the seat portion 20, a first outer race 50, which is adjacent the first mounting portion 26, and a series of bearings 52 positioned between the first inner race 48 and the first outer race 50. The second bearing assembly 46 includes a second inner race 54, which is adjacent the seat portion 20, a second outer race 56, which is adjacent the second mounting portion 30, and a series of bearings 52 positioned between the second inner race 54 and the second outer race 56.

In a preferred embodiment, the first operating member 16 and the second operating member 18 are rotatably supported by the rotation assembly 14 on the base member 12 about the bicycle handlebar 100 when the base member 12 is mounted on the bicycle handlebar 100. More specifically, the first mounting portion 26 is seated on the first bearing assembly 44 such that the first operating member 16 can rotate between a first rest position and a first operation position. Further, the second mounting portion 30 is seated on the second bearing assembly 46 such that the second operating member 18 can rotate between a second rest position and a second operation position.

As shown in FIG. 1, in a preferred embodiment, the bicycle operating device 10 includes a cover ring 58 that surrounds the bicycle handlebar 100, is seated on the seat portion 20 and is spaced from the flange portion 22. The rotation assembly 14 and the first and second operating members 16 and 18 are positioned between the cover ring 58 and the flange portion 22 and are rotatable with respect thereto. In a preferred embodiment, the bicycle operating device 10 includes first, second and third spacers 60a, 60b and 60c that are positioned between and attached to the cover ring 58 and the flange portion 22. The first, second and third spacers 60a, 60b and 60c can be attached to the cover ring 58 and the flange portion 22 and secure the cover ring 58 and the flange portion 22 together by any method, e.g., welding, glue, rivets, threaded fasteners, etc. In the figures, the cover ring 58 has openings 58a and the flange portion 22 has openings 22a that receive threaded fasteners 61 extending into the first, second and third spacers 60a, 60b and 60c.

With reference to FIGS. 4A-4C, in a preferred embodiment, when the first operating member 16 is rotated to the first operation position, the second operating member 18 remains stationary (see FIG. 4B). The first operating member 16 and the second operating member 18 rotate together when the second operating member is rotated to the second operation position (see FIG. 4C). Essentially, the second operating member 18 pushes the first operating member 16 when the second operating member 18 is rotated (by a user pushing the second user interface portion 32) to the second operation position. As shown in FIG. 4C, the first operating member 16 abuts third spacer 60c to limit movement of the first and/or second operating members 16 and 18 when rotated toward the operation position.

In a preferred embodiment, the first operating member 16 is biased toward the first rest position and the second operating member 18 is biased toward the second rest position. Those of skill in the art will appreciate that this can be accomplished in a number of ways. As is best shown in FIG. 4A-4C, in a preferred embodiment, the bicycle operating device 10 includes a first spring 62 that extends between a nub 64 that extends from the first mounting portion 26 and a nub 65 that extends from the first spacer 60a. The nub 64 includes an opening therein 64a that receives one of two ends of the first spring 62. The nub 65 includes an opening 65a therein that receives the other of the two ends of the first spring 62. The first spring 62 biases the first operating member 16 to the first rest position (due to the tension/drawing force in the first spring 62) when the first operating member 16 is released. The bicycle operating device 10 includes a second spring 66 that extends between a post 68 that extends from the second mounting portion 30 and a post 69 that extends from the second spacer 60b. The post 68 receives one of two ends of the second spring 66. The post 69 receives the other of the two ends of the second spring 66. The second spring 66 biases the second operating member 18 to the second rest position (due to the compression/expanding force of the second spring 66) when the second operating member 18 is released.

In a preferred embodiment of the invention, the movement or rotation of the first and second operating members 16 and 18 causes the bicycle operating device 10 to operate at least bicycle component, e.g., a shifter/derailleur. For example, rotation of the first operating member 16 from the first rest position to the first operation position can result in an upshift and movement or the rotation of the second operating member 18 from the second rest position to the second operation position (which, as described above, also moves the first operating member 16) can result in a downshift. It will be understood that this is only exemplary and the bicycle operating device 10 can be used for operating other components, such as brakes, a light or other known bicycle components.

In a preferred embodiment, the rotation of the first and/or second operating members 16 and 18 is sensed by a sensing unit that is in electrical communication with the bicycle component, which thereby signals the bicycle component to operate (e.g., shift). Use of a sensing unit such as this is known the art and can utilize conventional technology, such as a magnet field detecting system. For example, see U.S. Patent Publication No. 2007/0193387 to Nakano, discussed above. In an exemplary embodiment, the sensing unit (which is labeled 70 in FIGS. 1-3) can be mounted on the base member 12. However, this is not a limitation on the present invention.

In an embodiment, the second operating member and all components related thereto can be omitted and only the first operating member can be utilized to operate a bicycle component. In another embodiment, the first and second operating members can operate different bicycle components. In another embodiment, the bicycle operating device can include a "click-feel" assembly that allows a user to feel when an operation (such as a shift) has occurred when they press the first and/or second user interface portions.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including," "having" and their derivatives. The term "mounted" or "mounting," as used herein, encompasses configurations in which an element directly secured to another element by affixing the element is directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "attached", "bonded", "fixed" and their derivatives. Also, the terms "part," "section," "portion," "member" or "element" when used in the singular can have the dual meaning of a single part or a plurality of parts. As used herein to describe the above embodiment(s), the following directional terms "forward," "rearward," "rightward," "leftward," "outward," "forward," "inward," "downward," "upward," "above," "below," "vertical," "horizontal," and "transverse" as well as any other similar directional terms refer to those directions of a bicycle equipped with the bicycle control device. Accordingly, these terms, as utilized to describe the bicycle control device should be interpreted relative to a bicycle equipped with the bicycle control device as used in the normal riding position on a level surface. Finally, terms of degree such as "substantially," "about" and "approximately" as used herein mean a reasonable amount of deviation of the modified term such that the end result is not significantly changed.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will begin with the words "means for"). Accordingly, the applicant reserves the right to add additional claims after filing the application to pursue such additional claim forms for other aspects of the disclosure.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

The invention claimed is:

1. A bicycle operating device for operating at least one bicycle component, the bicycle operating device comprising:

a base member configured to be mounted on a bicycle handlebar that defines a handlebar axis, and a first operating member that includes a first mounting portion rotatably supported on the base member about the bicycle handlebar when the base member is mounted on the bicycle handlebar, and a first user interface portion adjustably connected to the first mounting portion, wherein the first user interface portion is adjustable with respect to the first mounting portion in a first direction, wherein the first mounting portion defines a first axis that is coaxial with the handlebar axis when the bicycle operating device is mounted on the bicycle handlebar.

2. The bicycle operating device of claim 1 wherein when the bicycle operating device is mounted on the bicycle handlebar the first direction is parallel to the handlebar axis.

3. The bicycle operating device of claim 2 wherein the first operating member rotates from a first rest position to a first operation position and is biased toward the first rest position to return to the first rest position.

4. The bicycle operating device of claim 2 wherein the first operating member includes a first arm extending from the first mounting member in a direction that is generally parallel to the handlebar axis when the bicycle operating device is mounted on the bicycle handlebar, and wherein the first user interface portion is received on the first arm.

5. The bicycle operating device of claim 1 further comprising a second operating member supported on the base member.

6. The bicycle operating device of claim 5 wherein the second operating member is configured to rotate about the bicycle handlebar when the base member is mounted on the bicycle handlebar.

7. The bicycle operating device of claim 6 wherein the second operating member includes a second mounting portion rotatably supported on the base member about the bicycle handlebar when the base member is mounted on the bicycle handlebar, and a second user interface portion connected to the second mounting portion.

8. The bicycle operating device of claim 7 wherein the second mounting portion defines a second axis, and wherein the first axis, second axis and handlebar axis are coaxial when the bicycle operating device is mounted on the bicycle handlebar.

9. The bicycle operating device of claim 1 wherein the bicycle operating device is used for electrically operating at least one bicycle component.

10. A bicycle operating device for operating at least one bicycle component, the bicycle operating device comprising:

a base member configured to be mounted on a bicycle handlebar that defines a handlebar axis, a first operating member that includes a first mounting portion rotatably supported on the base member about the bicycle handlebar when the base member is mounted on the bicycle handlebar, and a first user interface portion adjustably connected to the first mounting portion, wherein the first user interface portion is adjustable with respect to the first mounting portion in a first direction, and a second operating member supported on the base member, wherein the second operating member is configured to rotate about the bicycle handlebar when the base member is mounted on the bicycle handlebar, wherein the second operating member includes a second mounting portion rotatably supported on the base member about the bicycle handlebar when the base member is mounted on the bicycle handlebar, and a second user interface portion connected to the second mounting portion, and wherein the second user interface portion is adjustably connected to the second mounting portion.

11. A bicycle operating device for operating at least one bicycle component, the bicycle operating device comprising:

a base member configured to be mounted on a bicycle handlebar that defines a handlebar axis, and a first operating member including a first mounting portion rotatably supported on the base member about the bicycle handlebar when the base member is mounted on the bicycle handlebar, and a first user interface portion adjustably connected to the first mounting portion, wherein the first user interface portion is adjustable in a first direction, and wherein when the bicycle operating device is mounted on the bicycle handlebar the first direction is parallel to the handlebar axis, and a second operating member including a second mounting portion rotatably supported on the base member about the bicycle handlebar when the base member is mounted on the bicycle handlebar, and a second user interface portion adjustably connected to the second mounting portion.

12. The bicycle operating device of claim 11 wherein the second user interface portion is adjustable in a second direction, and wherein when the bicycle operating device is mounted on the bicycle handlebar the second direction is parallel to the handlebar axis.

13. The bicycle operating device of claim 12 wherein the first operating member is rotatable from a first rest position to a first operation position and is biased toward the first rest position to return to the first rest position, and wherein the second operating member is rotatable from a second rest position to a second operation position and is biased toward the second rest position to return to the second rest position.

14. The bicycle operating device of claim 13 wherein when the bicycle operating device is mounted on the bicycle handlebar and the first operating member is rotated to the first operation position, the second operating member remains stationary, and wherein the first operating member and the second operating member rotate together when the second operating member is rotated to the second operation position.

15. A bicycle operating device for electrically operating at least one bicycle component, the bicycle operating device comprising:

a base member configured to be attached to a bicycle handlebar that has a handlebar axis, a first operating member movably supported on the base member, wherein the first operating member includes a first mounting portion movably attached to the base member and a first user interface portion adjustably connected to the first mounting portion, wherein the first user interface portion is adjustable in a direction parallel to the handlebar axis when the base member is attached to the bicycle handlebar, and a second operating member movably supported on the base member, wherein the second operating member includes a second mounting portion movably attached to the base member and a second user interface portion connected to the second mounting portion, wherein the second mounting portion is positioned on the base member axially adjacent to the first mounting portion.

16. The bicycle operating device of claim 15 wherein the first mounting portion is rotatably supported on the base member about the bicycle handlebar when the base member is attached to the bicycle handlebar.

17. The bicycle operating device of claim 16 wherein the second mounting portion is rotatably supported on the base member about the bicycle handlebar when the base member is attached to the bicycle handlebar.

18. The bicycle operating device of claim 17 wherein the second user interface portion is adjustably connected to the second mounting portion.

19. The bicycle operating device of claim 18 wherein the second user interface portion is adjustable in a direction parallel to the handlebar axis when the base member is attached to the bicycle handlebar.

20. The bicycle operating device of claim 19 wherein when the base member is attached to the bicycle handlebar, the first mounting portion rotates about the bicycle handlebar while the second mounting portion remains stationary when the first operating member is operated, and wherein the first mounting portion and the second mounting portion rotate together about the bicycle handlebar when the second operating member is operated.

21. The bicycle operating device of claim 16 wherein the first mounting portion defines a first axis, and wherein the first axis is coaxial with the handlebar axis when the base member is attached to the bicycle handlebar.

22. The bicycle operating device of claim 21 wherein the second mounting portion defines a second axis that is coaxial with the handlebar axis and the first axis.

23. The bicycle operating device of claim 22 wherein the second user interface portion is adjustably connected to the second mounting portion, and wherein the second user interface portion is adjustable in a direction parallel to the handlebar axis when the base member is attached to the bicycle handlebar.

24. The bicycle operating device of claim 15 wherein the first operating member can rotate about the base member with respect to the second operating member.

* * * * *